April 15, 1924.

J. BRENZINGER

MEANS FOR SOLDERING

Filed June 13, 1922

1,490,087

INVENTOR
Julius Brenzinger
BY
ATTORNEY

Patented Apr. 15, 1924.

1,490,087

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

MEANS FOR SOLDERING.

Application filed June 13, 1922. Serial No. 568,069.

*To all whom it may concern:*

Be it known that I, JULIUS BRENZINGER, a citizen of the United States, and a resident of Fairfield, in the county of Fairfield and State of Connecticut, have invented certain new and useful Means for Soldering, of which the following is a specification.

The present invention relates to a means of soldering two elements together and has for its main object and feature a simple and effective means for carrying on the soldering operation in an automatic or semi-automatic manner.

In the accompanying drawings the invention is disclosed in a concrete and preferred form in which.

Figure 1:
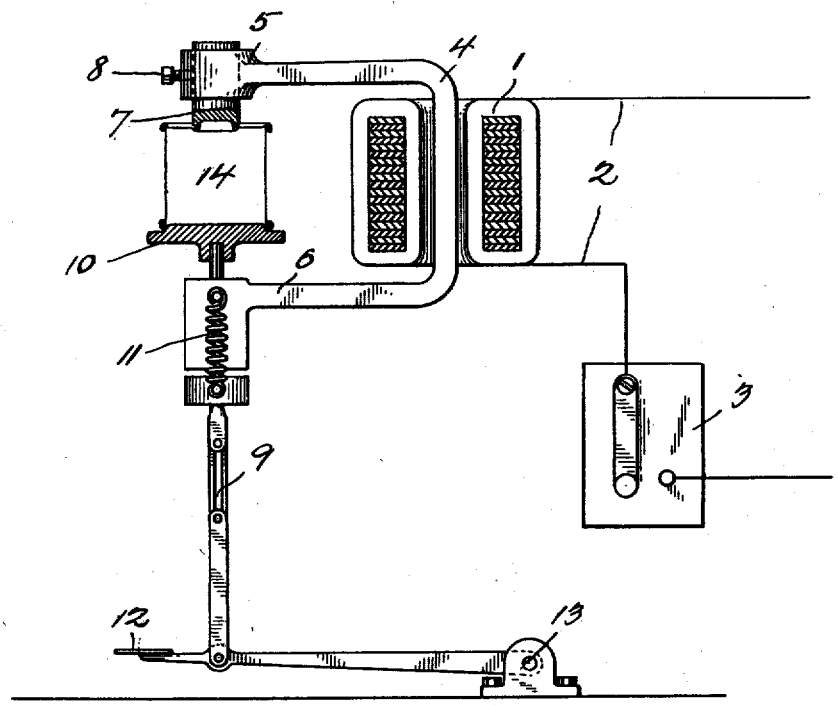
Fig. 1 is a side elevation of a device embodying the invention.

1 indicates a transformer, of any suitable construction, through the primary of which there is a circuit 2 controlled by a switch or rheostat 3. The secondary 4 of this transformer is a bar of brass or copper forming a bracket having two terminals 5 and 6. Terminal 5 carries a head 7 of conductive material, which head is preferably removable and adjustable and when inserted or adjusted can be secured in position by set screw 8. Terminal 6 preferably forms a guide in which is slidingly mounted stem 9 of pedestal 10 also of conductive material. Suitable means are provided for moving members 7 and 10 toward and away from each other, these means, in the present instance, taking the form of a spring 11 anchored on terminal 6 and secured to stem 9, said spring normally tending to move stem 9 and pedestal 10 in an upward direction, a foot pedal 12, hinged at 13, being provided to lower said stem.

Figure 2:
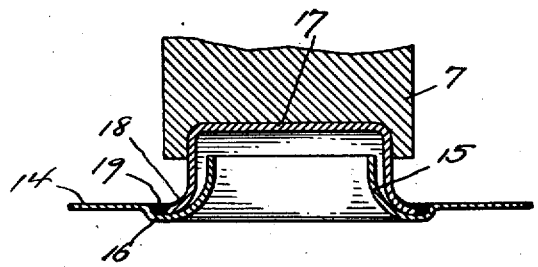
Fig. 2 is a sectional detail view of two elements soldered together by the device shown in Fig. 1.

As an exemplification of the process carried on by the device there is shown a container 14 consisting of a body and ends, one of said ends having a spout 15 surrounded by a depression 16. 17 indicates a cap having a flange 18 carrying a body of solder 19. The cap is placed in contact with the container with the flange of the cap in the depression aforesaid. The assembled elements are then placed on the pedestal which is raised thereby clamping the elements between the two members 7 and 10 of the clamp. Switch 3 is now closed thereby sending a low voltage current through secondary 4 and the cap and container thereby softening the solder and causing it to flow over the joint between the cap and container as indicated in Fig. 2. The switch may now be opened and the current turned off thereby allowing the solder to resolidify, after which the pedestal is lowered and the united container and cap removed.

I claim:

1. A soldering device comprising: a transformer, the secondary of which is a bracket having two terminals, a head mounted in one of said terminals, a pedestal slidingly mounted in the other terminal, and means for moving the pedestal toward and away from the head.

2. A soldering device comprising: a transformer, the secondary of which is a bracket having two terminals, a head mounted in one of said terminals, a pedestal slidingly mounted in the other terminal, and means for moving the pedestal toward and away from the head and means for controlling a circuit passing through the primary of the transformer.

3. A soldering device comprising: a transformer the secondary of which is a U-shaped member the middle portion of which is encircled by the primary and the legs of which constitute the terminals of an incomplete electric circuit that is completed by the work, a head carried by one of said terminals and electrically connected thereto, and a pedestal slidingly mounted in the other terminal and electrically connected thereto.

Signed at Bridgeport, in the county of Fairfield and State of Connecticut, this 5th day of June, 1922.

JULIUS BRENZINGER.